(12) United States Patent
Yellore

(10) Patent No.: US 12,365,417 B2
(45) Date of Patent: Jul. 22, 2025

(54) CONTROLLER FOR STRADDLE-TYPE VEHICLE, RIDER-ASSISTANCE SYSTEM, AND CONTROL METHOD FOR STRADDLE-TYPE VEHICLE

(71) Applicant: Robert Bosch GmbH, Stuttgart (DE)

(72) Inventor: Ashwin Yellore, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 152 days.

(21) Appl. No.: 18/013,003

(22) PCT Filed: Jun. 11, 2021

(86) PCT No.: PCT/IB2021/055154
§ 371 (c)(1),
(2) Date: Dec. 27, 2022

(87) PCT Pub. No.: WO2021/260480
PCT Pub. Date: Dec. 30, 2021

(65) Prior Publication Data
US 2023/0249778 A1    Aug. 10, 2023

(30) Foreign Application Priority Data
Jun. 26, 2020    (JP) .................................. 2020-110092

(51) Int. Cl.
*B62K 17/00*    (2006.01)
*B62J 50/22*    (2020.01)

(52) U.S. Cl.
CPC .............. *B62K 17/00* (2013.01); *B62J 50/22* (2020.02)

(58) Field of Classification Search
CPC ..... B62K 17/00; B62J 50/22; B60W 30/0956; B60W 30/14; B60W 2300/36;
(Continued)

(56) References Cited

U.S. PATENT DOCUMENTS

2015/0166062 A1* 6/2015 Johnson ................. G08G 1/167
701/41
2016/0306357 A1* 10/2016 Wieskamp ............ B60W 30/12
(Continued)

FOREIGN PATENT DOCUMENTS

JP    2009116882 A    5/2009
JP    2017039487 A    2/2017
(Continued)

OTHER PUBLICATIONS

International Search Report and Written Opinion for Application No. PCT/IB2021/055154 dated Sep. 10, 2021 (10 pages).

*Primary Examiner* — Ashley L Redhead, Jr.
(74) *Attorney, Agent, or Firm* — Michael Best & Friedrich LLP

(57) ABSTRACT

The present invention obtains a controller capable of handling special travel made by a straddle-type vehicle. The present invention also obtains a rider-assistance system including such a controller. The present invention further obtains a control method capable of handling special travel made by a straddle-type vehicle.

Surrounding environment information of a straddle-type vehicle (100) is acquired on the basis of output of at least one surrounding environment detector (11). Then, based on the surrounding environment information, presence or absence of slip-by travel between rows of vehicles made by the straddle-type vehicle (100) is analyzed. As a result, rider-assistance operation that corresponds to the analysis result is executed.

12 Claims, 3 Drawing Sheets

(58) Field of Classification Search
CPC ..... B60W 2554/406; B60W 2554/801; B60W 2554/802; B60W 2554/804; B60W 50/14; G08G 1/165; G08G 1/166
See application file for complete search history.

(56) References Cited

U.S. PATENT DOCUMENTS

| | | | |
|---|---|---|---|
| 2017/0169710 A1* | 6/2017 | Beaurepaire | G08G 1/163 |
| 2017/0213149 A1* | 7/2017 | Micks | G06N 3/088 |
| 2017/0354196 A1* | 12/2017 | Tammam | G08G 1/166 |
| 2019/0248367 A1* | 8/2019 | Knitt | B60W 10/184 |
| 2019/0329782 A1* | 10/2019 | Shalev-Shwartz | G05D 1/0253 |
| 2020/0156605 A1* | 5/2020 | Hamm | G08G 1/166 |
| 2020/0272160 A1* | 8/2020 | Djuric | G06T 7/20 |
| 2021/0070286 A1* | 3/2021 | Green | G06V 10/25 |
| 2021/0171026 A1* | 6/2021 | Pfau | B60W 30/095 |
| 2021/0294944 A1* | 9/2021 | Nassar | G06F 30/27 |
| 2022/0126864 A1* | 4/2022 | Moustafa | G06T 1/0007 |
| 2022/0135039 A1* | 5/2022 | Jardine | B60W 30/18159 701/26 |
| 2022/0144273 A1* | 5/2022 | Yamaguchi | B60W 60/00276 |

FOREIGN PATENT DOCUMENTS

| | | | |
|---|---|---|---|
| JP | 2019099033 A | 6/2019 | |
| WO | 2017115371 A1 | 7/2017 | |
| WO | 2019239402 A1 | 12/2019 | |
| WO | 2020041188 A1 | 2/2020 | |

* cited by examiner

[FIG. 1]
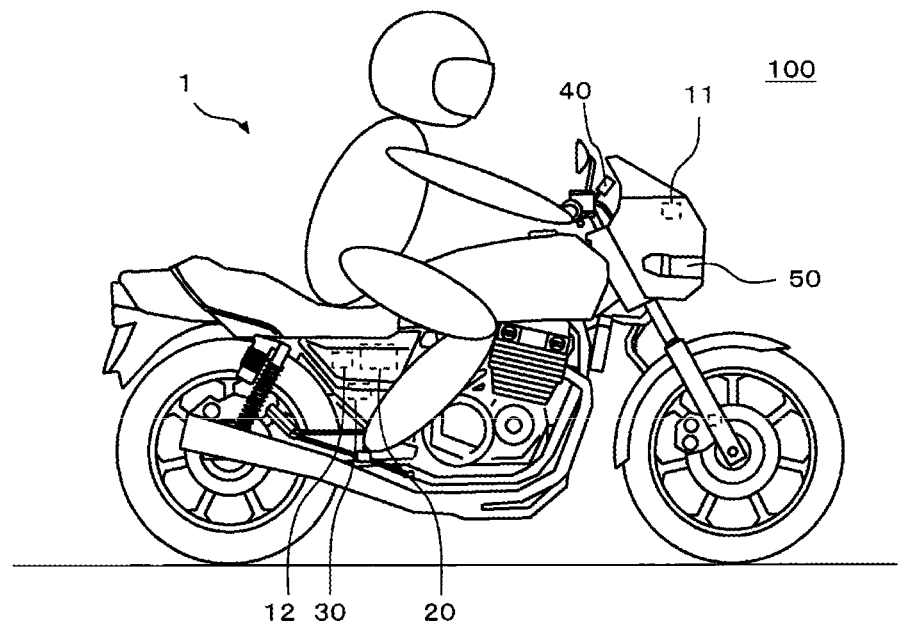
[FIG. 2]
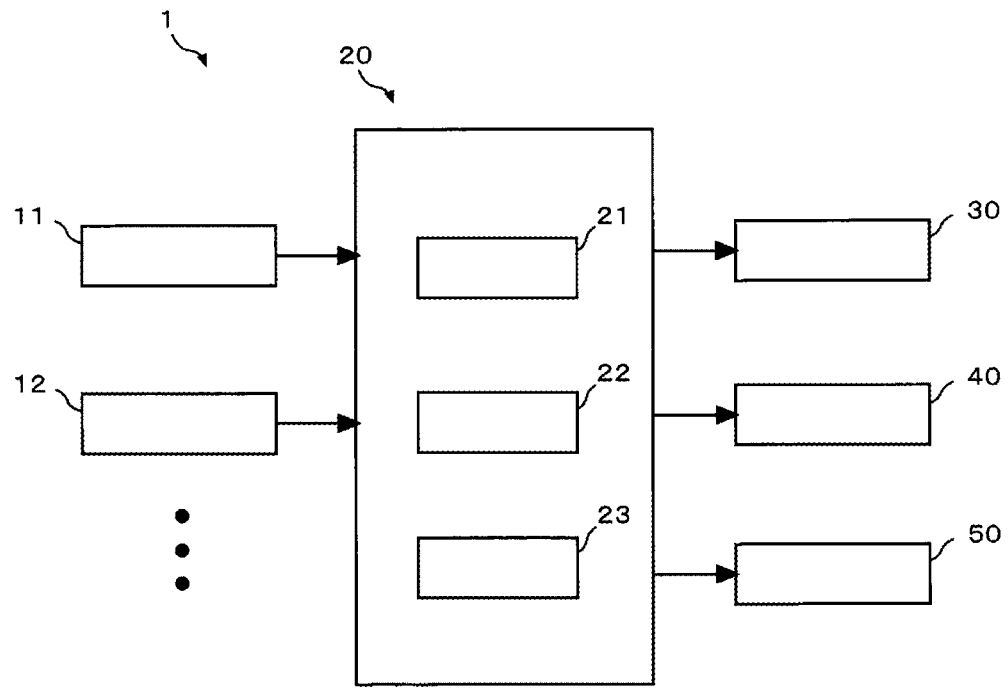

[FIG. 3]
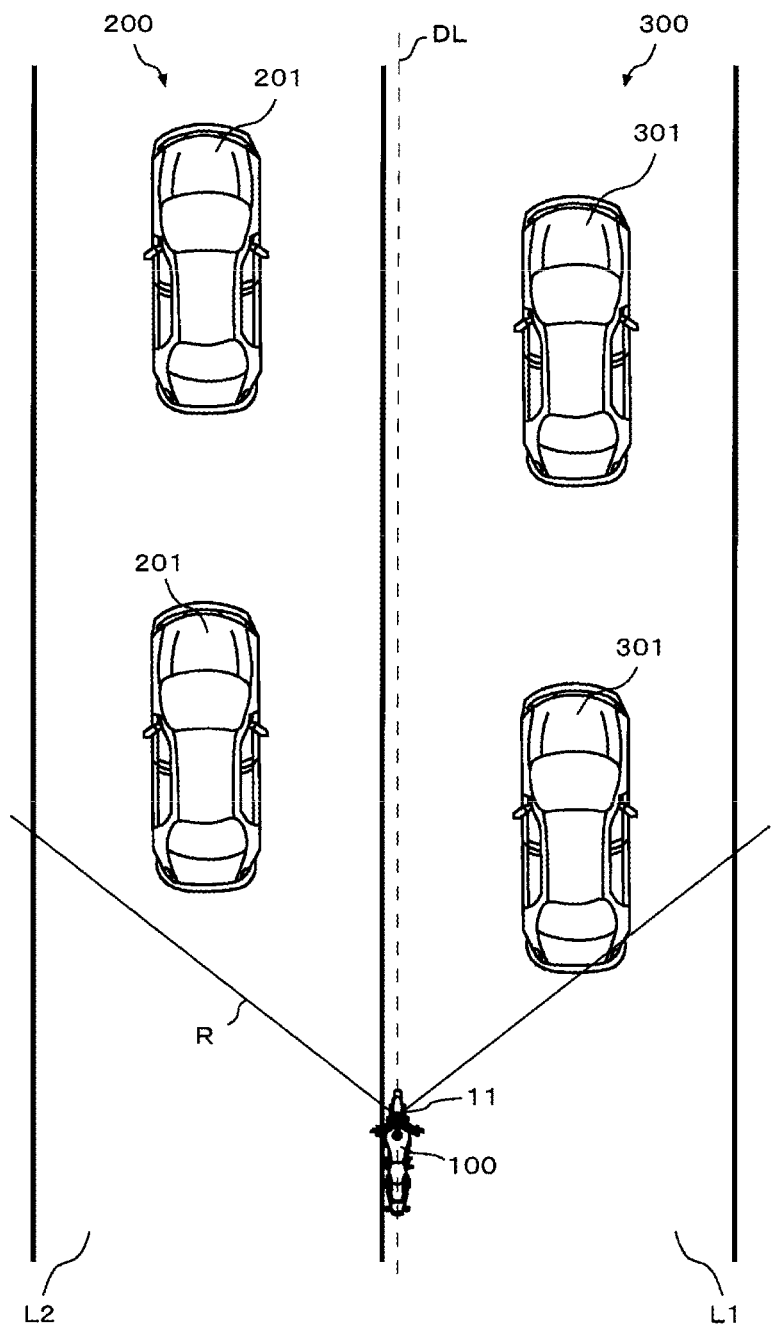

[FIG. 4]
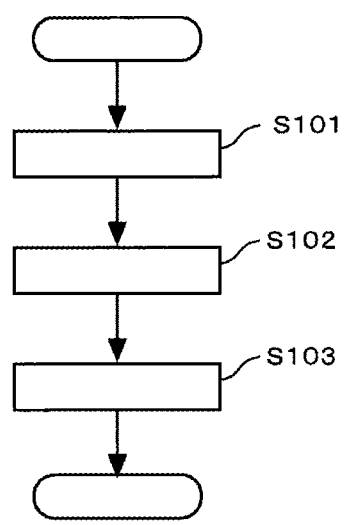

CONTROLLER FOR STRADDLE-TYPE VEHICLE, RIDER-ASSISTANCE SYSTEM, AND CONTROL METHOD FOR STRADDLE-TYPE VEHICLE

BACKGROUND OF THE INVENTION

The present invention relates to a controller for a straddle-type vehicle, to which at least one surrounding environment detector is mounted, a rider-assistance system including such a controller, and a control method for a straddle-type vehicle, to which at least one surrounding environment detector is mounted.

As a conventional straddle-type vehicle, a straddle-type vehicle, to which a rider-assistance system for assisting with a rider of the straddle-type vehicle is mounted, has been available (for example, JP-A-2009-116882).

SUMMARY OF THE INVENTION

Technical Problem

The straddle-type vehicle is much smaller than other vehicles (for example, a passenger car, a truck, and the like). For this reason, the straddle-type vehicle can make special travel that is not assumed by the other vehicles. There is a possibility that it is difficult for the rider-assistance system, which is mounted to the conventional straddle-type vehicle, to appropriately handle the special travel made by the straddle-type vehicle.

The present invention has been made with the above-described problem as the background and therefore obtains a controller capable of handling special travel made by a straddle-type vehicle. The present invention also obtains a rider-assistance system including such a controller. The present invention further obtains a control method capable of handling special travel made by a straddle-type vehicle.

Solution to Problem

A controller according to the present invention is a controller for a straddle-type vehicle, to which at least one surrounding environment detector is mounted. The controller includes an execution section that executes rider-assistance operation to assist with a rider of the straddle-type vehicle, and further includes: an acquisition section that acquires surrounding environment information of the straddle-type vehicle on the basis of output of the surrounding environment detector; and an analysis section that analyzes presence or absence of slip-by travel between rows of vehicles made by the straddle-type vehicle on the basis of the surrounding environment information acquired by the acquisition section. The execution section executes the rider-assistance operation that corresponds to an analysis result of the presence or the absence of the slip-by travel between the rows of vehicles by the analysis section.

A rider-assistance system according to the present invention includes the above-described controller.

A control method according to the present invention is a control method for a straddle-type vehicle, to which at least one surrounding environment detector is mounted. The control method includes an execution step in which an execution section of a controller executes rider-assistance operation to assist with a rider of the straddle-type vehicle, and further includes: an acquisition step in which an acquisition section of the controller acquires surrounding environment information of the straddle-type vehicle on the basis of output of the surrounding environment detector; and an analysis step in which an analysis section of the controller analyzes presence or absence of slip-by travel between rows of vehicles made by the straddle-type vehicle on the basis of the surrounding environment information acquired in the acquisition step. In the execution step, the execution section executes the rider-assistance operation that corresponds to an analysis result of the presence or the absence of the slip-by travel between the rows of vehicles made in the analysis step.

Advantageous Effects of Invention

In the controller, the rider-assistance system, and the control method according to the present invention, the surrounding environment information of the straddle-type vehicle is acquired on the basis of the output of the at least one surrounding environment detector. Then, based on the surrounding environment information, the presence or the absence of the slip-by travel between the rows of vehicles made by the straddle-type vehicle is analyzed. As a result, the rider-assistance operation that corresponds to the analysis result is executed. Therefore, it is possible to appropriately handle special travel made by the straddle-type vehicle.

BRIEF DESCRIPTION OF THE DRAWINGS

FIG. 1 is a view illustrating a mounted state of a rider-assistance system according to an embodiment of the present invention to a straddle-type vehicle.

FIG. 2 is a diagram illustrating a system configuration of the rider-assistance system according to the embodiment of the present invention.

FIG. 3 is a view illustrating a detection state of a surrounding environment detector in the rider-assistance system according to the embodiment of the present invention in a situation where the straddle-type vehicle makes slip-by travel between rows of vehicles.

FIG. 4 is a chart illustrating an operation flow of a controller in the rider-assistance system according to the embodiment of the present invention.

DETAILED DESCRIPTION

A description will hereinafter be made on a controller, a rider-assistance system, and a control method according to the present invention with reference to the drawings. Each of a configuration, operation, and the like, which will be described below, is merely one example, and the controller, the rider-assistance system, and the control method according to the present invention are not limited to a case with such a configuration, such operation, and the like.

For example, a description will hereinafter be made on a case where the rider-assistance system according to the present invention is used for a two-wheeled motor vehicle. However, the rider-assistance system according to the present invention may be used for a straddle-type vehicle other than the two-wheeled motor vehicle. Examples of the straddle-type vehicle are motorcycles (the two-wheeled motor vehicle and a three-wheeled motor vehicle), an all-terrain vehicle, and a pedal-driven vehicle. The motorcycles include: a vehicle that has an engine as a propelling source; a vehicle that has an electric motor as the propelling source; and the like, and examples of the motorcycle are a bike, a scooter, and an electric scooter. The pedal-driven vehicle means a vehicle in general that can travel forward on a road by a depression force applied to pedals by a rider. The pedal-driven vehicles include a normal pedal-driven vehicle, an electrically-assisted pedal-driven vehicle, an electric pedal-driven vehicle, and the like.

The same or similar description will appropriately be simplified or will not be made below. In the drawings, the same or similar portions will be denoted by the same reference sign or will not be denoted by a reference sign. In addition, a detailed structure will appropriately be illustrated in a simplified manner or will not be illustrated.

Embodiment

A description will hereinafter be made on a rider-assistance system according to an embodiment.

<Configuration of Rider-Assistance System>

A description will be made on a configuration of the rider-assistance system according to the embodiment.

FIG. 1 is a view illustrating a mounted state of the rider-assistance system according to the embodiment of the present invention to a straddle-type vehicle. FIG. 2 is a diagram illustrating a system configuration of the rider-assistance system according to the embodiment of the present invention. FIG. 3 is a view illustrating a detection state of a surrounding environment detector in the rider-assistance system according to the embodiment of the present invention in a situation where the straddle-type vehicle makes slip-by travel between rows of vehicles.

As illustrated in FIG. 1 to FIG. 3, a rider-assistance system 1 is mounted to a straddle-type vehicle 100. The rider-assistance system 1 includes: a surrounding environment detector 11 that detects surrounding environment information of the straddle-type vehicle 100; a travel state detector 12 that detects travel state information of the straddle-type vehicle 100; and a controller (ECU) 20.

The rider-assistance system 1 executes rider-assistance operation to assist with a rider of the straddle-type vehicle 100 by using the surrounding environment information that is acquired on the basis of output of the surrounding environment detector 11 when necessary. The controller 20 receives detection results by various detectors (not illustrated) that output other types of information (for example, information on a brake operation state by the rider, information on an accelerator operation state by the rider, and the like) when necessary. Each of the devices in the rider-assistance system 1 may exclusively be used for the rider-assistance system 1, or may be shared with another system.

Examples of the surrounding environment detector 11 are a radar, a Lidar sensor, an ultrasonic sensor, and a camera. The surrounding environment detector 11 may be provided as a single unit or may be divided into plural units. In the case where the single surrounding environment detector 11 is provided, the surrounding environment detector 11 is preferably provided to a front portion of the straddle-type vehicle 100, and a detection range R thereof preferably faces a front side on a travel line DL of the straddle-type vehicle 100. The surrounding environment detector 11 may be provided to a rear portion of the straddle-type vehicle 100, and the detection range R thereof may face a rear side on the travel line DL of the straddle-type vehicle 100. Meanwhile, in the case where the plural surrounding environment detectors 11 are provided, those surrounding environment detectors 11 are preferably provided to the front portion, a lateral portion, or the rear portion of the straddle-type vehicle 100, one of those detection ranges R preferably faces a left side of the travel line DL of the straddle-type vehicle 100, and the other of those detection ranges R preferably faces a right side of the travel line DL of the straddle-type vehicle 100. Furthermore, the other surrounding environment detector 11 that does not contribute to an analysis of presence or absence of the slip-by travel between the rows of vehicles, which will be described below, may be provided. Here, the travel line DL is a swept path of the straddle-type vehicle 100 in the past or the future.

The travel state detector 12 includes a vehicle speed sensor and an inertia sensor (IMU). The vehicle speed sensor detects a vehicle speed generated on the straddle-type vehicle 100. The inertia sensor detects three-axis acceleration and three-axis (roll, pitch, and yaw) angular velocities generated on the straddle-type vehicle 100. The travel state detector 12 may detect other physical quantities that can substantially be converted to the vehicle speed generated on the straddle-type vehicle 100, the three-axis acceleration generated on the straddle-type vehicle 100, and the three-axis angular velocities generated on the straddle-type vehicle 100. In addition, the inertia sensor may partially detect the three-axis acceleration and the three-axis angular velocities. Furthermore, when necessary, at least one of the vehicle speed sensor and the inertia sensor may not be provided, or another sensor may be added.

The controller 20 at least includes an acquisition section 21, an analysis section 22, and an execution section 23. The sections of the controller 20 may collectively be provided in a single casing or may separately be provided in multiple casings. In addition, the controller 20 may partially or entirely be constructed of a microcomputer, a microprocessor unit, or the like, may be constructed of a member in which firmware or the like can be updated, or may be a program module or the like that is executed by a command from a CPU or the like, for example.

As illustrated in FIG. 3, in a situation where the straddle-type vehicle 100 makes the slip-by travel between the rows of vehicles in which the straddle-type vehicle 100 slips by between a left row of vehicles 200 and a right row of vehicles 300, the acquisition section 21 acquires the surrounding environment information of the straddle-type vehicle 100 on the basis of the output of the surrounding environment detector 11.

More specifically, based on the output of the surrounding environment detector 11, the acquisition section 21 acquires left relative speed information that is information on a relative speed of a left row vehicle 201 to the straddle-type vehicle 100. The left row vehicle 201 is a vehicle that belongs to the left row of vehicles 200 as a row of vehicles located on the left side of the travel line DL of the straddle-type vehicle 100 (that is, a lane L2 in an example illustrated in FIG. 3). The left row vehicle 201 is preferably the vehicle, the relative distance of which to the straddle-type vehicle 100 is the shortest. With such a configuration, accuracy of the analysis of the presence or the absence of the slip-by travel between the rows of vehicles is improved. The left relative speed information may be information on an average relative speed of the two or more left row vehicles 201 to the straddle-type vehicle 100. With such a configuration, the accuracy of the analysis of the presence or the absence of the slip-by travel between the rows of vehicles is improved. Of the vehicles that are located on the left side of the travel line DL of the straddle-type vehicle 100, the vehicle, the relative distance of which to the straddle-type vehicle 100 falls below a reference value, is preferably selected as the left row vehicle 201. With such a configuration, the accuracy of the analysis of the presence or the absence of the slip-by travel between the rows of vehicles is improved. The left relative speed information is preferably information on the vehicle that is located on a front left side of the straddle-type vehicle 100. With such a configuration, it is possible to execute the further appropriate rider-assistance operation on the basis of a future forecast of the slip-by travel between the rows of vehicles. Here, the left relative speed information may be information on the vehicle that is located on a left side or a rear left side of the straddle-type vehicle 100. Even in such a case, it is possible to execute the appropriate rider-assistance operation. The left relative speed information may be a speed difference in a direction that is parallel to the travel line DL of the straddle-type vehicle 100, may be a differential value of an inter-vehicular distance, or may be another physical quantity that can substantially be converted to any of those. In the case where the left relative speed information is the speed difference in the direction that is parallel to the travel line DL of the straddle-type vehicle 100 or the other physical quantity that can substantially be converted thereto, the accuracy of the analysis of the presence or the absence of the slip-by travel between the rows of vehicles is improved.

The acquisition section 21 acquires left density information on the basis of the output of the surrounding environment detector 11. The left density information is information on density of the plural left row vehicles 201. Of the vehicles that are located on the left side of the travel line DL of the straddle-type vehicle 100, the vehicle, the relative distance of which to the straddle-type vehicle 100 falls below the reference value, is preferably selected as the left row vehicle 201. With such a configuration, the accuracy of the analysis of the presence or the absence of the slip-by travel between the rows of vehicles is improved. The left density information is preferably information on the vehicle that is located on the front left side of the straddle-type vehicle 100. With such a configuration, it is possible to execute the further appropriate rider-assistance operation on the basis of the future forecast of the slip-by travel between the rows of vehicles. The left density information may be information on the vehicle that is located on the left side or the rear left side of the straddle-type vehicle 100. Even in such a case, it is possible to execute the appropriate rider-assistance operation. The left density information may be a reciprocal of an inter-vehicular distance between the two left row vehicles 201, may be an average value of the reciprocals of the inter-vehicular distances among the three or more left row vehicles 201, may be the number of the left row vehicles 201 located within a specified area, may be a time interval of the overtaking by the straddle-type vehicle 100, or may be another physical quantity that can substantially be converted to any of those.

Based on the output of the surrounding environment detector 11, the acquisition section 21 acquires right relative speed information that is information on a relative speed of a right row vehicle 301 to the straddle-type vehicle 100. The right row vehicle 301 is a vehicle that belongs to the right row of vehicles 300 as a row of the vehicles located on the right side of the travel line DL of the straddle-type vehicle 100 (that is, a lane L1 in the example illustrated in FIG. 3). The right row vehicle 301 is preferably the vehicle, the relative distance of which to the straddle-type vehicle 100 is the shortest. With such a configuration, the accuracy of the analysis of the presence or the absence of the slip-by travel between the rows of vehicles is improved. The right relative speed information may be information on an average relative speed of the two or more right row vehicles 301 to the straddle-type vehicle 100. With such a configuration, the accuracy of the analysis of the presence or the absence of the slip-by travel between the rows of vehicles is improved. Of the vehicles that are located on the right side of the travel line DL of the straddle-type vehicle 100, the vehicle, the relative distance of which to the straddle-type vehicle 100 falls below a reference value, is preferably selected as the right row vehicle 301. With such a configuration, the accuracy of the analysis of the presence or the absence of the slip-by travel between the rows of vehicles is improved. The right relative speed information is preferably information on the vehicle that is located on a front right side of the straddle-type vehicle 100. With such a configuration, it is possible to execute the further appropriate rider-assistance operation on the basis of the future forecast of the slip-by travel between the rows of vehicles. The right relative speed information may be information on the vehicle that is located on a right side or a rear right side of the straddle-type vehicle 100. Even in such a case, it is possible to execute the appropriate rider-assistance operation. The right relative speed information may be the speed difference in the direction that is parallel to the travel line DL of the straddle-type vehicle 100, may be the differential value of the inter-vehicular distance, or may be another physical quantity that can substantially be converted to any of those. In the case where the right relative speed information is the speed difference in the direction that is parallel to the travel line DL of the straddle-type vehicle 100 or the other physical quantity that can substantially be converted thereto, the accuracy of the analysis of the presence or the absence of the slip-by travel between the rows of vehicles is improved.

The acquisition section 21 acquires right density information on the basis of the output of the surrounding environment detector 11. The right density information is information on density of the plural right row vehicles 301. Of the vehicles that are located on the right side of the travel line DL of the straddle-type vehicle 100, the vehicle, the relative distance of which to the straddle-type vehicle 100 falls below the reference value, is preferably selected as the right row vehicle 301. With such a configuration, the accuracy of the analysis of the presence or the absence of the slip-by travel between the rows of vehicles is improved. The right density information is preferably information on the vehicle that is located on the front right side of the straddle-type vehicle 100. With such a configuration, it is possible to execute the further appropriate rider-assistance operation on the basis of the future forecast of the slip-by travel between the rows of vehicles. The right density information may be information on the vehicle that is located on the right side or the rear right side of the straddle-type vehicle 100. Even in such a case, it is possible to execute the appropriate rider-assistance operation. The right density information may be a reciprocal of an inter-vehicular distance between the two right row vehicles 301, may be an average value of the reciprocals of the inter-vehicular distances among the three or more right row vehicles 301, may be the number of the right row vehicles 301 located within a specified area, may be the time interval of the overtaking by the straddle-type vehicle 100, or may be another physical quantity that can substantially be converted to any of those.

The analysis section 22 analyzes the presence or the absence of the slip-by travel between the rows of vehicles made by the straddle-type vehicle 100 on the basis of the surrounding environment information acquired by the acquisition section 21.

More specifically, the analysis section 22 determines that the slip-by travel between the rows of vehicles made by the straddle-type vehicle 100 is present in the case where the left relative speed information is information on the relative speed that falls below the reference value, the left density information is information on the density that exceeds a reference value, the right relative speed information is information on the relative speed that falls below the reference value, and the right density information is information on the density that exceeds a reference value.

The execution section 23 executes the rider-assistance operation that corresponds to an analysis result of the presence or the absence of the slip-by travel between the rows of vehicles by the analysis section 22.

As an example, the execution section 23 executes, as the rider-assistance operation, cruise control operation or adaptive cruise control operation of the straddle-type vehicle 100. In the cruise control operation, a behavior controller 30 controls various mechanisms (for example, a brake, an engine, and the like) such that the straddle-type vehicle 100 travels at a target speed set by the rider. In the adaptive cruise control operation, in addition to such control, an inter-vehicular distance from a preceding vehicle is maintained. More specifically, in the adaptive cruise control operation, when the preceding vehicle is not present, the behavior controller 30 controls the various mechanisms (for example, the brake, the engine, and the like) such that the straddle-type vehicle 100 travels at the target speed set by the rider. When the preceding vehicle is present, the behavior controller 30 controls the various mechanisms (for example, the brake, the engine, and the like) such that the straddle-type vehicle 100 travels at a speed which is equal to or lower than the target speed and at which the inter-vehicular distance from the preceding vehicle is maintained. The execution section 23 outputs, to the behavior controller 30, a control command for causing the various mechanisms (for example, the brake, the engine, and the like) to execute the cruise control operation or the adaptive cruise control operation. In the adaptive cruise control operation, the execution section 23 acquires a travel state (for example, a relative distance, a relative speed, relative acceleration, or the like to the straddle-type vehicle 100) of the preceding vehicle on the basis of the output of the surrounding environment detector 11 and sets the target speed. The rider can adjust the inter-vehicular distance from the preceding vehicle. In the case where the analysis section 22 determines that a travel state of the straddle-type vehicle 100 is the slip-by travel between the rows of vehicles (see FIG. 3) during the cruise control operation or the adaptive cruise control operation, the execution section 23 executes the rider-assistance operation corresponding to such a determination. For example, the execution section 23 forcibly cancels or interrupts the cruise control operation or the adaptive cruise control operation. Alternatively, for example, the execution section 23 forcible reduces the target speed in the cruise control operation or the adaptive cruise control operation by a specified amount or to a specified value.

As an example, the execution section 23 executes, as the rider-assistance operation, frontal collision suppression operation for the straddle-type vehicle 100. When the frontal collision suppression operation is activated, a collision possibility with a target (for example, the vehicle, a person, an animal, an obstacle, a fallen object, or the like) that is located in front of the straddle-type vehicle 100 is determined. Then, when the collision possibility is higher than a reference, a warning device 40 issues a warning. The warning device 40 may issue the warning by sound, may issue the warning by display or lighting, may issue the warning by vibration, or may issue the warning by a combination of any of those. The warning device 40 may generate the vibration as the warning by controlling the various mechanisms (for example, the brake, the engine, and the like) to instantaneously decelerate or accelerate the straddle-type vehicle 100. In order for the straddle-type vehicle 100 to automatically avoid the collision, in the frontal collision suppression operation, the behavior controller 30 may control the various mechanisms (for example, the brake, the engine, and the like). The execution section 23 acquires information on the target located ahead (for example, a relative distance, a relative speed, relative acceleration, and the like to the straddle-type vehicle 100) on the basis of the output of the surrounding environment detector 11, and determines the collision possibility. The warning device 40 may be provided to the straddle-type vehicle 100, may be provided to an accessory (for example, a helmet, a glove, or the like) associated with the straddle-type vehicle 100, may issue the warning to a driver of another vehicle, or may output a control command to a warning device in another vehicle or an accessory that is associated with another vehicle. In the case where the analysis section 22 determines that the travel state of the straddle-type vehicle 100 is the slip-by travel between the rows of vehicles (see FIG. 3) in a situation where the frontal collision suppression operation is activated, the execution section 23 executes the rider-assistance operation corresponding to such a determination. For example, the execution section 23 forcibly prohibits the issuance of the warning or weakens intensity of the warning by the frontal collision suppression operation. In addition, for example, the execution section 23 forcibly prohibits the straddle-type vehicle 100 from being decelerated for the warning or the avoidance. Furthermore, for example, the execution section 23 forcibly reduces an upper limit value of the deceleration that is generated on the straddle-type vehicle 100 for the warning or the avoidance. The rider-assistance operation, which is changed by the execution section 23 according to the determination result by the analysis section 22, may be the collision suppression operation for the target (for example, the vehicle, the fallen object, or the like) that is located behind or on the side of the straddle-type vehicle 100. Also, in such collision suppression operation, the execution section 23 may be operated in a similar manner to that in the frontal collision suppression operation.

As an example, the execution section 23 executes, as the rider-assistance operation, blind spot traveling vehicle warning operation for the straddle-type vehicle 100. When the blind spot traveling vehicle warning operation is activated, presence or absence of a vehicle that is located diagonally behind the straddle-type vehicle 100 is determined. In the case where such a vehicle is present, the warning device 40 issues the warning. The warning device 40 may issue the warning by sound, may issue the warning by display or lighting, may issue the warning by vibration, or may issue the warning by a combination of any of those. The warning device 40 may generate the vibration as the warning by controlling the various mechanisms (for example, the brake, the engine, and the like) to instantaneously decelerate or accelerate the straddle-type vehicle 100. The execution section 23 determines the presence or the absence of the vehicle that is located diagonally behind the straddle-type vehicle 100 on the basis of the output of the surrounding environment detector 11. In the case where the analysis section 22 determines that the travel state of the straddle-type vehicle 100 is the slip-by travel between the rows of vehicles (see FIG. 3) in a situation where the blind spot traveling vehicle warning operation is activated, the execution section 23 executes the rider-assistance operation corresponding to such a determination. For example, the execution section 23 forcibly prohibits the issuance of the warning or weakens the intensity of the warning by the blind spot traveling vehicle warning operation. In addition, for example, the execution section 23 forcibly prohibits the straddle-type vehicle 100 from being decelerated for the warning. Furthermore, for example, the execution section 23 forcibly reduces the upper limit value of the deceleration that is generated on the straddle-type vehicle 100 for the warning.

As an example, the execution section 23 executes, as the rider-assistance operation, overtaking travel assistance operation for the straddle-type vehicle 100. When the overtaking travel assistance operation is activated, presence or absence of the rider's intention to make the overtaking travel is determined. In the case where such an intention is present, the behavior controller 30 controls the various mechanisms (for example, the brake, the engine, and the like) such that the acceleration of the straddle-type vehicle 100 is increased by a specified magnitude. The execution section 23 outputs, to the behavior controller 30, a control command for causing the various mechanisms (for example, the brake, the engine, and the like) to execute the overtaking travel assistance operation. In the case where the analysis section 22 determines that the travel state of the straddle-type vehicle 100 is the overtaking travel between the rows of vehicles (see FIG. 3) in a situation where the overtaking travel assistance operation is activated, the execution section 23 executes the rider-assistance operation corresponding to such a determination. For example, the execution section 23 forcibly prohibits the increase in the acceleration by the overtaking travel assistance operation. Alternatively, for example, the execution section 23 reduces the increase in the acceleration by the specified magnitude or to a specified value.

As an example, in the case where the analysis section 22 determines that the travel state of the straddle-type vehicle 100 is the slip-by travel between the rows of vehicles (see FIG. 3), the execution section 23 executes the rider-assistance operation to change the speed or a speed gradient of the straddle-type vehicle 100. The execution section 23 outputs, to the behavior controller 30, a control command for causing the various mechanisms (for example, the brake, the engine, and the like) to change the speed or the speed gradient. For example, the execution section 23 forcibly reduces the speed that is generated on the straddle-type vehicle 100 by a specified amount or to a specified value. Alternatively, for example, the execution section 23 forcibly reduces the acceleration that is generated on the straddle-type vehicle 100 by a specified magnitude or to a specified value. Further alternatively, for example, the execution section 23 forcibly increases the deceleration that is generated on the straddle-type vehicle 100 by a specified magnitude or to a specified value. Here, the speed gradient is a concept that includes both of the acceleration and the deceleration.

As an example, in the case where the analysis section 22 determines that the travel state of the straddle-type vehicle 100 is the slip-by travel between the rows of vehicles (see FIG. 3), the execution section 23 executes the rider-assistance operation to change operation of an indicator light device 50 in the straddle-type vehicle 100. The execution section 23 outputs a control command to the indicator light device 50. For example, the execution section 23 starts turning on or causing a headlight as the indicator light device 50 to blink. Alternatively, for example, the execution section 23 changes illumination by the headlight as the indicator light device 50 to high beam illumination. Further alternatively, for example, the execution section 23 starts causing turn signals on both of right and left sides as the indicator light devices 50 to blink or starts turning on the turn signals. At the time, only the turn signals that are provided on both of the right and left sides in the front portion of the straddle-type vehicle 100 may blink or be turned on. In addition to those, the turn signals that are provided on both of the right and left sides in the rear portion of the straddle-type vehicle 100 may also blink or be turned on.

<Operation of Rider-Assistance System>

A description will be made on operation of the rider-assistance system according to the embodiment.

FIG. 4 is a chart illustrating an operation flow of the controller in the rider-assistance system according to the embodiment of the present invention. An order of steps may appropriately be switched, or a different step may appropriately be added.

The controller 20 repeatedly executes the operation flow illustrated in FIG. 4 during the travel of the straddle-type vehicle 100.

(Acquisition Step)

In step S101, the acquisition section 21 acquires the surrounding environment information of the straddle-type vehicle 100 on the basis of the output of the surrounding environment detector 11.

(Analysis Step)

Next, in step S102, the analysis section 22 analyzes the presence or the absence of the slip-by travel between the rows of vehicles made by the straddle-type vehicle 100 on the basis of the surrounding environment information acquired in step S101.

(Execution Step)

Next, in step S103, the execution section 23 executes the rider-assistance operation that corresponds to the analysis result of the presence or the absence of the slip-by travel between the rows of vehicles in step S102.

<Effects of Rider-Assistance System>

A description will be made on effects of the rider-assistance system according to the embodiment.

In the rider-assistance system 1, the surrounding environment information of the straddle-type vehicle 100 is acquired on the basis of the output of the at least one surrounding environment detector 11. Then, based on the surrounding environment information, the presence or the absence of the slip-by travel between the rows of vehicles made by the straddle-type vehicle 100 is analyzed. As a result, the rider-assistance operation that corresponds to the analysis result is executed. Thus, it is possible to appropriately handle special travel made by the straddle-type vehicle 100.

Preferably, the acquisition section 21 acquires, as the surrounding environment information, the surrounding environment information on environment in front of the straddle-type vehicle 100. With such a configuration, it is possible to execute the further appropriate rider-assistance operation on the basis of the future forecast of the slip-by travel between the rows of vehicles to be made by the straddle-type vehicle 100.

Preferably, the acquisition section 21 acquires, as the surrounding environment information: the left relative speed information that is the information on the relative speed of the at least one left row vehicle 201 to the straddle-type vehicle 100; the left density information that is the information on the density of the plural left row vehicles 201; the right relative speed information that is the information on the relative speed of the at least one right row vehicle 301 to the straddle-type vehicle 100; and the right density information that is the information on the density of the plural right row vehicles 301. With such a configuration, the slip-by travel between the rows of vehicles made by the straddle-type vehicle 100 is accurately analyzed. In particular, of the vehicles that are located around the straddle-type vehicle 100, the acquisition section 21 preferably selects the vehicle, the relative distance of which to the straddle-type vehicle 100 falls below the reference value, as the left row vehicle 201 or the right row vehicle 301. With such a configuration, the slip-by travel between the rows of vehicles made by the straddle-type vehicle 100 is further accurately analyzed.

Preferably, the execution section 23 changes the cruise control operation or the adaptive cruise control operation for the straddle-type vehicle 100 according to the analysis result of the presence or the absence of the slip-by travel between the rows of vehicles by the analysis section 22. In addition, the execution section 23 changes the collision suppression operation for the straddle-type vehicle 100 according to the analysis result of the presence or the absence of the slip-by travel between the rows of vehicles by the analysis section 22. Furthermore, the execution section 23 changes the blind spot traveling vehicle warning operation for the straddle-type vehicle 100 according to the analysis result of the presence or the absence of the slip-by travel between the rows of vehicles by the analysis section 22. Moreover, the execution section 23 changes the overtaking travel assistance operation for the straddle-type vehicle 100 according to the analysis result of the presence or the absence of the slip-by travel between the rows of vehicles by the analysis section 22. In those types of the operations, necessity of using the appropriate information is high. That is, the analysis of the presence or the absence of the slip-by travel between the rows of vehicles made by the straddle-type vehicle 100 is especially useful for those types of the operations.

Preferably, the execution section 23 executes the rider-assistance operation to change the speed or the speed gradient of the straddle-type vehicle 100 according to the analysis result of the presence or the absence of the slip-by travel between the rows of vehicles by the analysis section 22. In addition, the execution section 23 executes the rider-assistance operation to change the operation of the indicator light device 50 of the straddle-type vehicle 100 according to the analysis result of the presence or the absence of the slip-by travel between the rows of vehicles by the analysis section 22. With such a configuration, the special travel made by the straddle-type vehicle 100 can further appropriately be handled.

The embodiment of the present invention is not limited to that in the above description. That is, the present invention includes modes in each of which the embodiment that has been described so far is modified. In addition, the present invention includes a mode in which the embodiment that has been described so far is only partially implemented or a mode in which the modes are combined.

For example, the description has been made so far on the case where the acquisition section 21 acquires, as the surrounding environment information, the left relative speed information, the left density information, the right relative speed information, and the right density information. However, the acquisition section 21 may acquire another type of the information. That is, the analysis section 22 may analyze the presence or the absence of the slip-by travel between the rows of vehicles made by the straddle-type vehicle 100 on the basis of the other type of the information. For example, the acquisition section 21 may acquire: information on absolute speeds of the plural left row vehicles 201, the relative distance of each of which to the straddle-type vehicle 100 is shorter than the specified value; information on absolute speeds of the plural right row vehicles 301, the relative distance of each of which to the straddle-type vehicle 100 is shorter than the specified value; and information on a travel position of the straddle-type vehicle 100. Then, based on those types of the information, the analysis section 22 may analyze the presence or the absence of the slip-by travel between the rows of vehicles made by the straddle-type vehicle 100. At the time, the density in the left row of vehicles 200 and the density in the right row of vehicles 300 may be taken into consideration or may not be taken into consideration. In addition, a legal speed may be taken into consideration.

REFERENCE SIGNS LIST

1: Rider-assistance system
11: Surrounding environment detector
12: Travel state detector
20: Controller
21: Acquisition section
22: Analysis section
23: Execution section
30: Behavior controller
40: Warning device
50: Indicator light device
100: Straddle-type vehicle
200, 300: Row of vehicles
201, 301: Vehicle
DL: Travel line
L1, L2: Lane
R: Detection range

The invention claimed is:

1. A controller (20) for a straddle-type vehicle (100), to which at least one surrounding environment detector (11) is mounted, the controller (20) comprising:
an execution section (23) that executes a rider-assistance operation to assist with a rider of the straddle-type vehicle (100);
an acquisition section (21) that acquires surrounding environment information of the straddle-type vehicle (100) on the basis of output of the surrounding environment detector (11); and
an analysis section (22) that analyzes presence or absence of slip-by travel between rows of vehicles, in which the straddle-type vehicle (100) slips by between a left row of vehicles and a right row of vehicles, made by the straddle-type vehicle (100) on the basis of the surrounding environment information acquired by the acquisition section (21), wherein
the execution section (23) executes the rider-assistance operation that corresponds to an analysis result of the presence or the absence of the slip-by travel between the rows of vehicles by the analysis section (22) when the analysis section (22) determines that a travel state of the straddle-type vehicle (100) is the slip-by travel between the rows of vehicles.

2. The controller (20) according to claim 1, wherein the acquisition section (21) acquires, as the surrounding environment information, surrounding environment information on environment in front of the straddle-type vehicle (100).

3. The controller (20) according to claim 1, wherein the acquisition section (21) acquires, as the surrounding environment information:
left relative speed information that is information on a relative speed of at least one left row vehicle (201) to the straddle-type vehicle (100), the at least one left row vehicle (201) being a vehicle that belongs to a left row of vehicles (200) as a row of vehicles located on a left side of a travel line (DL) of the straddle-type vehicle (100);

left density information that is information on density of the plural left row vehicles (201);

right relative speed information that is information on a relative speed of at least one right row vehicle (301) to the straddle-type vehicle (100), the at least one right row vehicle (301) being a vehicle that belongs to a right row of vehicles (300) as a row of vehicles located on a right side of the travel line (DL) of the straddle-type vehicle (100); and right density information that is information on density of the plural right row vehicles (301).

4. The controller (20) according to claim 3, wherein of vehicles that are located around the straddle-type vehicle (100), the acquisition section (21) selects a vehicle, a relative distance of which to the straddle-type vehicle (100) falls below a reference value, as the left row vehicle (201) or the right row vehicle (301).

5. The controller (20) according to claim 1, wherein the execution section (23) changes cruise control operation or adaptive cruise control operation for the straddle-type vehicle (100), which is executed as the rider-assistance operation, according to the analysis result of the presence or the absence of the slip-by travel between the rows of vehicles by the analysis section (22).

6. The controller (20) according to claim 1, wherein the execution section (23) changes collision suppression operation for the straddle-type vehicle (100), which is executed as the rider-assistance operation, according to the analysis result of the presence or the absence of the slip-by travel between the rows of vehicles by the analysis section (22).

7. The controller (20) according to claim 1, wherein the execution section (23) changes blind spot traveling vehicle warning operation for the straddle-type vehicle (100), which is executed as the rider-assistance operation, according to the analysis result of the presence or the absence of the slip-by travel between the rows of vehicles by the analysis section (22).

8. The controller (20) according to claim 1, wherein the execution section (23) changes overtaking travel assistance operation for the straddle-type vehicle (100), which is executed as the rider-assistance operation, according to the analysis result of the presence or the absence of the slip-by travel between the rows of vehicles by the analysis section (22).

9. The controller (20) according to claim 1, wherein the execution section (23) executes the rider-assistance operation to change a speed or a speed gradient of the straddle-type vehicle (100) according to the analysis result of the presence or the absence of the slip-by travel between the rows of vehicles by the analysis section (22).

10. The controller (20) according to claim 1, wherein the execution section (23) executes the rider-assistance operation to change operation of an indicator light device of the straddle-type vehicle (100) according to the analysis result of the presence or the absence of the slip-by travel between the rows of vehicles by the analysis section (22).

11. A rider-assistance system (1) comprising:
a controller (20) having
an execution section (23) that executes a rider-assistance operation to assist with a rider of the straddle-type vehicle (100);
an acquisition section (21) that acquires surrounding environment information of the straddle-type vehicle (100) on the basis of output of a surrounding environment detector (11); and
an analysis section (22) that analyzes presence or absence of slip-by travel between rows of vehicles, in which the straddle-type vehicle (100) slips by between a left row of vehicles and a right row of vehicles, made by the straddle-type vehicle (100) on the basis of the surrounding environment information acquired by the acquisition section (21), wherein
the execution section (23) executes the rider-assistance operation that corresponds to an analysis result of the presence or the absence of the slip-by travel between the rows of vehicles by the analysis section (22) when the analysis section (22) determines that a travel state of the straddle-type vehicle (100) is the slip-by travel between the rows of vehicles.

12. A control method for a straddle-type vehicle (100), to which at least one surrounding environment detector (11) is mounted, the control method comprising:
an execution step (S103) in which an execution section (23) of a controller (20) executes a rider-assistance operation to assist with a rider of the straddle-type vehicle (100), and further comprising:
an acquisition step (S101) in which an acquisition section (21) of the controller (20) acquires surrounding environment information of the straddle-type vehicle (100) on the basis of output of the surrounding environment detector (11); and
an analysis step (S102) in which an analysis section (22) of the controller (20) analyzes presence or absence of slip-by travel between rows of vehicles, in which the straddle-type vehicle (100) slips by between a left row of vehicles and a right row of vehicles, made by the straddle-type vehicle (100) on the basis of the surrounding environment information acquired in the acquisition step (S101), wherein in the execution step (S103), the execution section (23) executes the rider-assistance operation that corresponds to an analysis result of the presence or the absence of the slip-by travel between the rows of vehicles made in the analysis step (S102) when the analysis section (22) determines that a travel state of the straddle-type vehicle (100) is the slip-by travel between the rows of vehicles.

* * * * *